US012799950B2

(12) United States Patent
Weinmeister et al.

(10) Patent No.: US 12,799,950 B2
(45) **Date of Patent: *Nov. 17, 2026**

(54) PORTABLE FAN

(71) Applicant: SUPER VACUUM MANUFACTURING COMPANY, INC., Fort Collins, CO (US)

(72) Inventors: Roger Weinmeister, Windsor, CO (US); Thomas Falloon, Fort Collins, CO (US)

(73) Assignee: Super Vacuum Manufacturing Company, Inc., Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/891,502

(22) Filed: Sep. 20, 2024

(65) Prior Publication Data

US 2025/0027510 A1 Jan. 23, 2025

Related U.S. Application Data

(63) Continuation of application No. 18/467,055, filed on Sep. 14, 2023, now abandoned, which is a continuation of application No. 17/445,841, filed on Aug. 25, 2021, now Pat. No. 11,795,970, which is a continuation of application No. 16/728,678, filed on Dec. 27, 2019, now Pat. No. 11,131,321.

(60) Provisional application No. 62/842,107, filed on May 2, 2019, provisional application No. 62/785,384, filed on Dec. 27, 2018.

(51) Int. Cl.

| | |
|---|---|
| ***F04D 29/52*** | (2006.01) |
| ***A62C 3/02*** | (2006.01) |
| ***F04D 25/06*** | (2006.01) |
| ***F04D 25/08*** | (2006.01) |
| ***F04D 29/00*** | (2006.01) |

(52) U.S. Cl.

CPC ....... *F04D 29/522* (2013.01); *F04D 25/0673* (2013.01); *F04D 29/002* (2013.01); *A62C 3/0207* (2013.01); *F04D 25/08* (2013.01)

(58) Field of Classification Search

CPC .... F04D 25/0673; F04D 25/08; F04D 29/403; F04D 29/522; F04D 29/601; F04D 19/002

See application file for complete search history.

(56) References Cited

U.S. PATENT DOCUMENTS

| | | | | |
|---|---|---|---|---|
| 2,633,293 A * | 3/1953 | Jones | F04D 29/646 | 417/361 |
| 2,868,558 A * | 1/1959 | Krauss | F04D 29/646 | 280/47.131 |
| 2,954,198 A * | 9/1960 | Lindberg | F04D 29/646 | 416/246 |
| 5,941,314 A * | 8/1999 | Weinmeister | A62C 8/00 | 169/48 |

(Continued)

*Primary Examiner* — Nathaniel E Wiehe
*Assistant Examiner* — Jackson N Gillenwaters
(74) *Attorney, Agent, or Firm* — Talus Law Group LLC

(57) ABSTRACT

The present invention is directed to a portable fan for the use in firefighting and other ventilation use-cases. The portable fan provides firefighters the ability to provide positive pressure ventilation in use for fighting fires which does not require power cables or combustible fuel powered motors, and provides increased portability, reduced risk, and reduced deployment time associated with managing and fighting a fire.

8 Claims, 12 Drawing Sheets

(56) References Cited

U.S. PATENT DOCUMENTS

| | | | | |
|---|---|---|---|---|
| 6,503,063 | B1 * | 1/2003 | Brunsell | F04D 29/602 417/234 |
| 10,029,131 | B2 * | 7/2018 | Mueller | A62C 3/0207 |
| 10,837,592 | B2 * | 11/2020 | Coffman, III | F16M 1/04 |
| 2005/0118022 | A1 * | 6/2005 | Fu | F04D 29/703 416/63 |
| 2005/0196290 | A1 * | 9/2005 | Hu | F04B 35/06 417/572 |

* cited by examiner

PORTABLE FAN

CROSS REFERENCE TO RELATED APPLICATIONS

This application is a continuation of U.S. patent application Ser. No. 18/467,055 entitled "PORTABLE FAN" and filed on Sep. 14, 2023, which is a continuation of U.S. patent application Ser. No. 17/445,841 entitled "PORTABLE FAN" and filed on Aug. 25, 2021, now U.S. Pat. No. 11,795,970, which is a continuation of U.S. patent application Ser. No. 16/728,678 entitled "PORTABLE FAN" and filed on Dec. 27, 2019, now U.S. Pat. No. 11,131,321, which claims the benefit of U.S. Provisional Patent Application No. 62/785,384 filed on Dec. 27, 2018; and U.S. Provisional Patent Application 62/842,107 entitled "PORTABLE FAN" filed on May 2, 2019, the entire contents of which are incorporated herein by reference in its entirety for all purposes.

FIELD OF THE INVENTION

The present invention is directed to a portable fan for the use in firefighting and other ventilation use-cases. A portable fan provides firefighters the ability to provide positive pressure ventilation in use for fighting fires, which does not require power cables or combustible fuel powered motors, to provide increased portability, reduced risk, and reduced deployment time associated with managing and fighting a fire.

BACKGROUND OF THE INVENTION

Firefighters increasingly use a method of managing fires using a method commonly referred to as Positive Pressure Ventilation (PPV) which is a ventilation technique use by fire fighters to remove smoke, heat, and other combustion products from a structure. The use of PPV allows firefighters to perform tasks in a more controlled environment resulting in a more efficient management of a fire affected structure and a reduction of risk. In practice, PPV allows fire fighters to positively pressurize a structure in which they have strategically opened vent locations elsewhere in the structure. When the structure is placed under positive pressure when performing a PPV operation, the combustion products are directed toward the vent locations, where they exit the vent locations and are exhausted away from the structure. In certain scenarios, firefighters may pressurize a structure without vent locations to force combustion products to flow to a "protected" area wherein the combustion products are isolated away from individuals trapped within the structure. The PPV process is commonly accepted and found to be effective by the National Institute of Safety and of Standards and Technology. (Kerber, Stephen, et al. Go With the Flow: NIST Study Proves PPV Can Save Lives & Improve Safety. Tech Focus, FireRescue Magazine, November 2009 [online], [retrieved on 2019 Dec. 11]. Retrieved from Internet URL: https://tsapps.nist.gov/publication/get_pdf.cfm?pub_id=904210)

The act of fighting fires is inherently dangerous where the difference of seconds in performing certain operations can mean the difference between life and death. Smoke inhalation is the primary cause of fire-related deaths. Seconds can be saved, and actions performed with increased efficiency and reliability—results in an increase of victim rescue success and a reduction of firefighter death.

SUMMARY OF THE INVENTION

It is common practice to use fans to initiate PPV operations in order to provide more suitable and favorable conditions in a fire affected structure after the fan has been extinguished. These fans are typically electrically, or fuel powered.

A common shortfall with electrically powered fans surrounds the availability of power. This is limited by availability of power as well as the length of power cord available which limits the distance from the power source that the fan can be set up for use. Establishing power through the use of a generator or on-board power aboard a fire truck requires personnel and steps which delay the establishment of the fan for PPV use. The more quickly a PPV fan can be established, the more quickly a fire affected structure can be cleared of combustion products-, thereby reducing the risk of death from smoke inhalation.

A common shortfall with fuel powered fans surrounds the maintenance and reliability. A fuel powered fan employs a fuel powered motor to operate the fan, and the fuel powered motor requires regular maintenance and upkeep to ensure the reliability of the fan to operate when needed. Without regular maintenance, fuel powered motors may be difficult to start or stall. In both these scenarios, an increased likelihood of injury or death exists to both fire victims and firefighting personnel as this delays the clearing of smoke from the structure. Furthermore, combustion hazards exist with the use of a fuel powered fan near a fire affected building. Because the fuel powered fan includes a reservoir, great care must be taken to prevent the fuel source of the fan from becoming a secondary source of combustion resulting in the reignition of a structure fire which has already been extinguished. Full powered fans can also be undesirable because by-products of combustion from the fuel powered motor can add carbon monoxide and other undesirable fumes into the structure.

It is an aspect of certain embodiments of the present invention to provide a reliable and rapidly deployed portable fan which does not require the limiting tether of an electrical cord or a combustion risk associated with a fuel reservoir. Certain embodiments of the present invention operate on commonly available batteries, such as those used with cordless power tools. As fire crews commonly rely upon battery operated power tools for managing a fire affected building, it is an aspect of certain embodiments to leverage the batteries which a fire crew already uses with existing tools. This limits the need for the purchase and charging of alternate batteries and increases the ease of readiness for establishing a portable fan.

Certain embodiments are configured to receive an existing rechargeable battery allowing as user to change the battery in the event that the battery charge has been exhausted. Certain embodiments are configured to receive multiple rechargeable batteries allowing a user to replace a first battery while a second battery remains attached to the portable fan to continue powering the fan in the event of a battery change.

Certain embodiments of the present invention includes a battery dock and battery holster. The battery holster being interconnected to the frame, has electrical connection to the portable fan. The battery dock is configured to mate with the battery holster and with a battery simultaneously such that the interconnection of the battery, battery dock, and battery holster provides electrical power from the battery to the portable fan. The battery dock being interchangeable and configurable to mate with any existing battery mounting design allows a user to leverage any existing rechargeable battery. It will be appreciated that a user may use rechargeable tool batteries manufactured by Dewalt®, Milwaukee®, Ridgid®, Ryobi®, or Makita®. It will be further appreciated that the use of batteries manufactured by entities not disclosed are within the scope and spirit of the present invention.

Some PPV fan motors require a higher voltage than existing tool batteries are able to supply. It is an aspect of the present invention to allow the alternative use of multiple batteries in series or parallel, and allow the draw of power from a single battery at a time or multiple batteries at once to provide the power needed to operate the portable fan as disclosed herein.

Certain embodiments comprise a portable fan having a power assembly adapted to monitor the power available in multiple rechargeable batteries and to draw power alternatively from the individual batteries for periods time based upon time, voltage, and/or current so that the power in each of the multiple batteries drains at a relatively constant rate with no noticeable change to the end user. The electronic circuitry of the power assembly may also be adapted to manage the use of power from multiple rechargeable batteries for powering the fan motor and other electronic functions of the portable fan.

In certain embodiments, a power assembly the power assembly is adapted to monitor the power available in multiple rechargeable batteries and to draw power from the individual batteries in order to equalize the power available in each battery. In one example of this embodiment, when the end user inserts multiple rechargeable batteries having different power levels into the battery holster, the power assembly will determine the power available in each battery and draw power first from the battery (or batteries) having more available power until the power available in all of the multiple batteries is relatively the same. Once the available power in all of the multiple batteries is relatively the same, the power assembly will draw power alternatively from the individual batteries for periods of time based on time, voltage, and/or current so that the power in each of the multiple batteries drains at a relatively constant rate.

In certain embodiments, a power assembly is configured to balance the power available between multiple rechargeable batteries while the portable fan is not in use.

In certain embodiments, a power assembly comprises circuitry for controlling the supply of electricity to the fan motor, for monitoring and displaying power available in the rechargeable batteries, for controlling recharging of the batteries from an A/C power source, for controlling the fan speed, and for sensing an external A/C power source and switching off the power supply from the batteries when A/C power is detected. Furthermore, the electronic circuitry of the power assembly may be adapted to regulate charging current or voltage using semiconductor devices or other electrical circuits only, or regulated in response to non-electric parameters such as battery temperature only or in combination with semiconductor devices or other electrical circuits.

Firefighters often wear protective gear and equipment that typically weighs in excess of 31.7 kg (70 lb) For this reason, extra equipment that must be carried by a firefighter is particularly burdensome and may require more than one firefighter to carry. An existing shortfall with some existing fans surrounds weight and portability. Some existing PPV fans, for instance, weigh 31.7 kg (70 lb) or more. These fans often require multiple individuals to carry thus reducing the availability of personnel to carry out other necessary tasks. Further still, some existing PPV fans—such as U.S. Pat. No. 5,941,314 to Weinmister, et al. issued Aug. 24, 1999, herein incorporated in its entirety for all purposes—attempt to provide a foldable handle to engage wheels thereby allowing an individual to roll the fan to a location. Where such solutions fall short surround the operability of the fan in a closed configuration. Furthermore, storage space on a firefighting vehicle is limited, such solutions require a large volume for storage and transportation even in a closed configuration.

It is an aspect of the present invention to provide a portable fan which is lighter, more portable, and requires a smaller volume for storage and transportation when in a closed configuration than existing PPV fans.

These and other advantages will be apparent from the disclosure of the inventions contained herein. The above-described embodiments, objectives, and configurations are neither complete nor exhaustive. As will be appreciated, other embodiments of the invention are possible using, alone or in combination, one or more of the features set forth above or described in detail below. Further, this Summary is neither intended nor should it be construed as being representative of the full extent and scope of the present invention. The present invention is set forth in various levels of detail in this Summary, as well as in the attached drawings and the detailed description below, and no limitation as to the scope of the present invention is intended to either the inclusion or non-inclusion of elements, components, etc. in this Summary. Additional aspects of the present invention will become more readily apparent from the detailed description, particularly when taken together with the drawings, and the claims provided herein.

BRIEF DESCRIPTION OF THE DRAWINGS

FIG. 1B—A front view of certain embodiments in first configuration

FIG. 2B—A side view of certain embodiments in second configuration

FIG. 3B—A top view of certain embodiments

DETAILED DESCRIPTION OF VARIOUS EMBODIMENTS

Figure 1A:
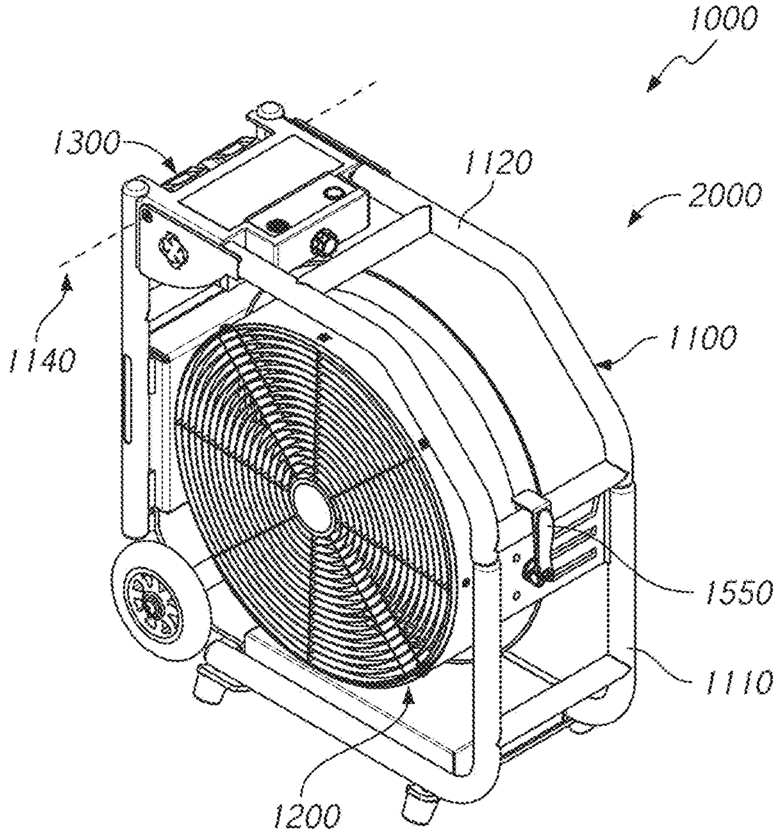
FIG. 1A—A perspective view of certain embodiments in first configuration
Figure 1B:
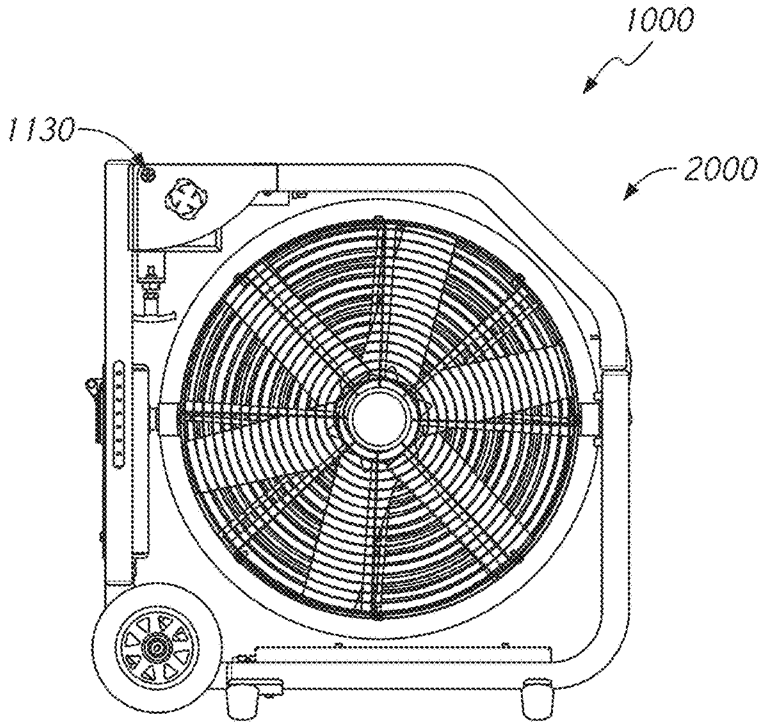
Figure 2A:
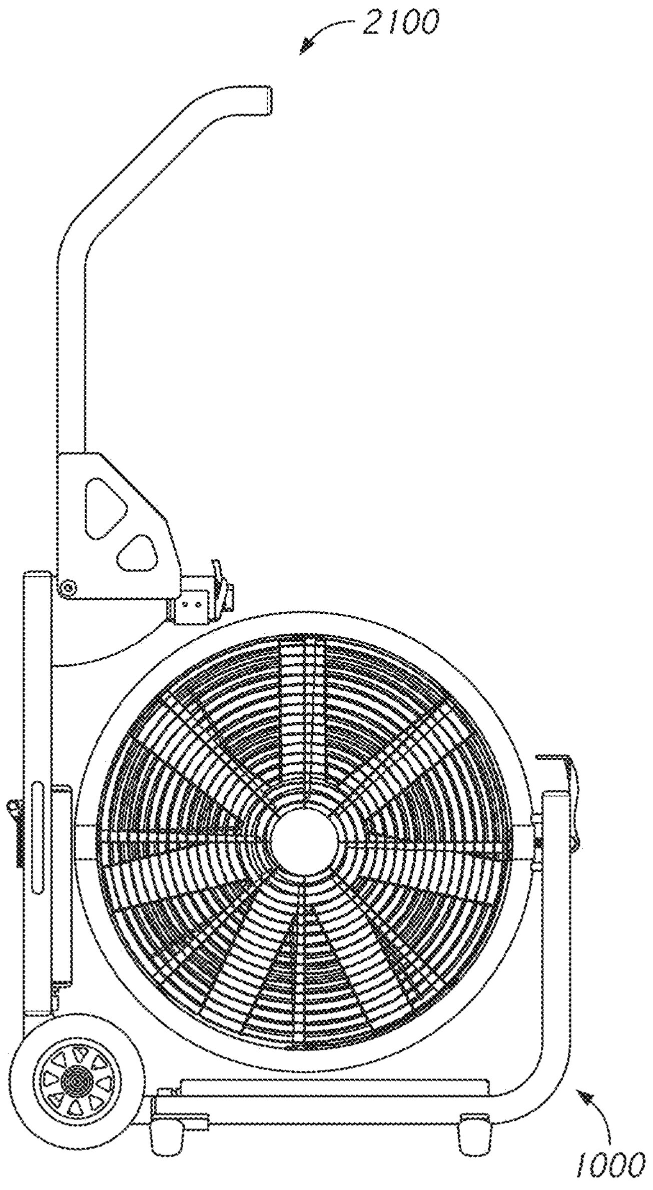
FIG. 2A—A front view of certain embodiments in second configuration
Figure 2B:
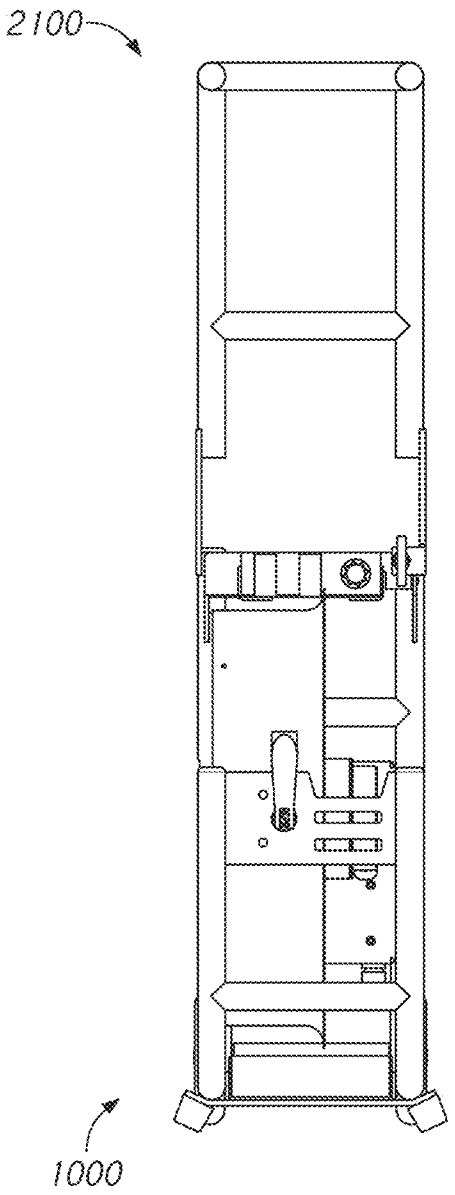

Certain embodiments of the present invention, shown in FIG. 1A-FIG. 1B, comprise a portable fan 1000 having a frame 1100, fan assembly 1200 and power assembly 1300. The frame 1100 of certain embodiments comprises a first frame portion 1110 rotatively connected by a hinge 1130 to a second frame portion 1120. The hinge 1130, consistent with a first axis of rotation 1140, allows the second frame 1120 portion to rotate upwards from a first configuration 2000 as shown in FIG. 1A-FIG. 1B, to a second configuration 2100 shown in FIG. 2A-FIG. 2B. In certain embodiments, a first configuration 2000 comprises the first frame portion 1110 and the second frame portion 1120 surrounding the fan assembly. Alternatively, the second configuration 2100 comprises the second frame 1120 portion in an open configuration in relation to the first frame portion 1110.

Figure 3A:
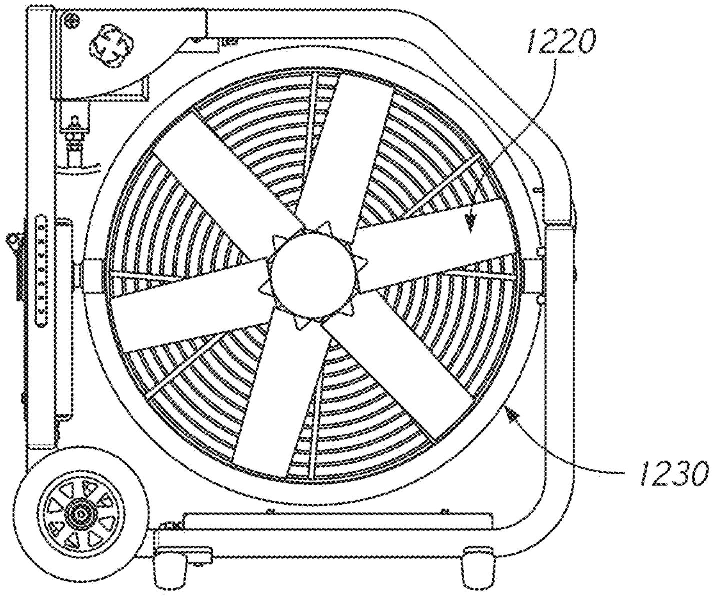
FIG. 3A—A front view of certain embodiments
Figure 3B:
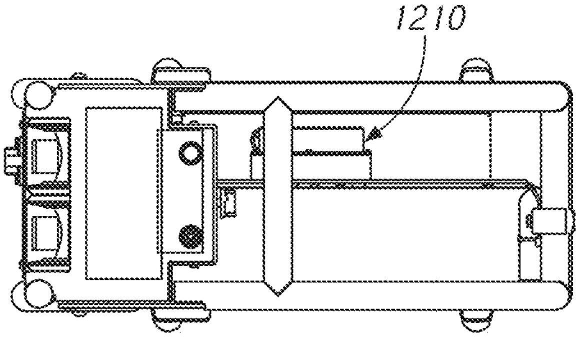

A fan assembly 1200, shown in FIG. 3A-FIG. 3B, of certain embodiments comprises a motor 1210, a fan blade 1220, and a shroud 1230. However, it will be appreciated that a fan or fan assembly surrounds a machine used to produce airflow in a desired direction. It will be further appreciated that certain fan assemblies rely on differing technology to produce airflow including axial-flow fans as shown, centrifugal fans, and bladeless indirect viscous-shear fans such as U.S. Pat. No. 8,308,445 to Peter Gammack, et al—the contents of which are incorporated herein by reference for all purposes. Thus, embodiments comprising an axial-flow fan, centrifugal fan, bladeless indirect viscous-shear fans are within the spirit and scope of the present invention.

Figure 4A:
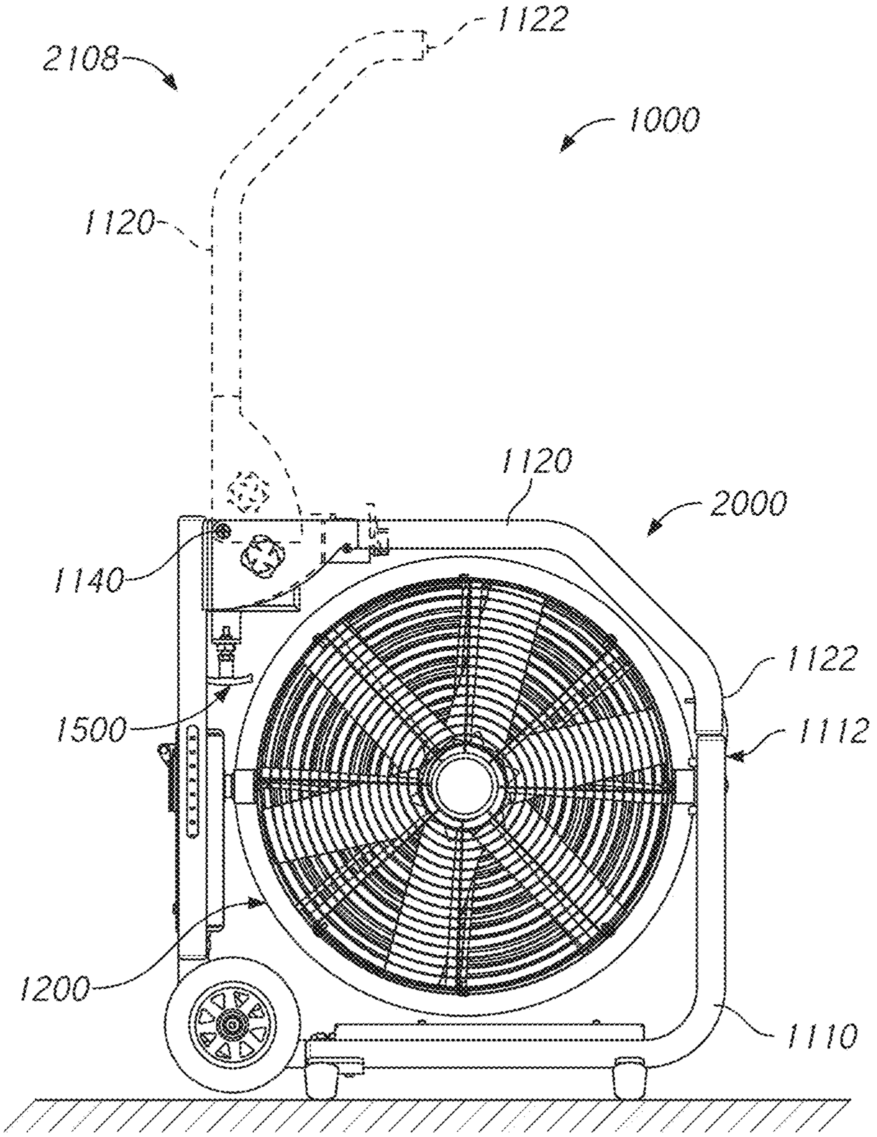
FIG. 4A—A front view of certain embodiments showing a first configuration and second configuration FIG. 4B—A front view of certain embodiments showing a first configuration and second configuration FIG. 5A—A perspective view of certain embodiments FIG. 5B—A bottom view of certain embodiments FIG. 6A—A front view of certain embodiments in second configuration with a fan assembly directed in a downward direction FIG. 6B—A side view of certain embodiments in second configuration with a fan assembly directed in a downward direction FIG. 6C—A side view of certain embodiments in second configuration showing potential fan assembly positions FIG. 7A—A perspective view of certain embodiments FIG. 7B—A front view of certain embodiments FIG. 8A—A side view of certain embodiments FIG. 8B—A power assembly of certain embodiments FIG. 8C—A battery dock and battery of certain embodiments
Figure 4B:
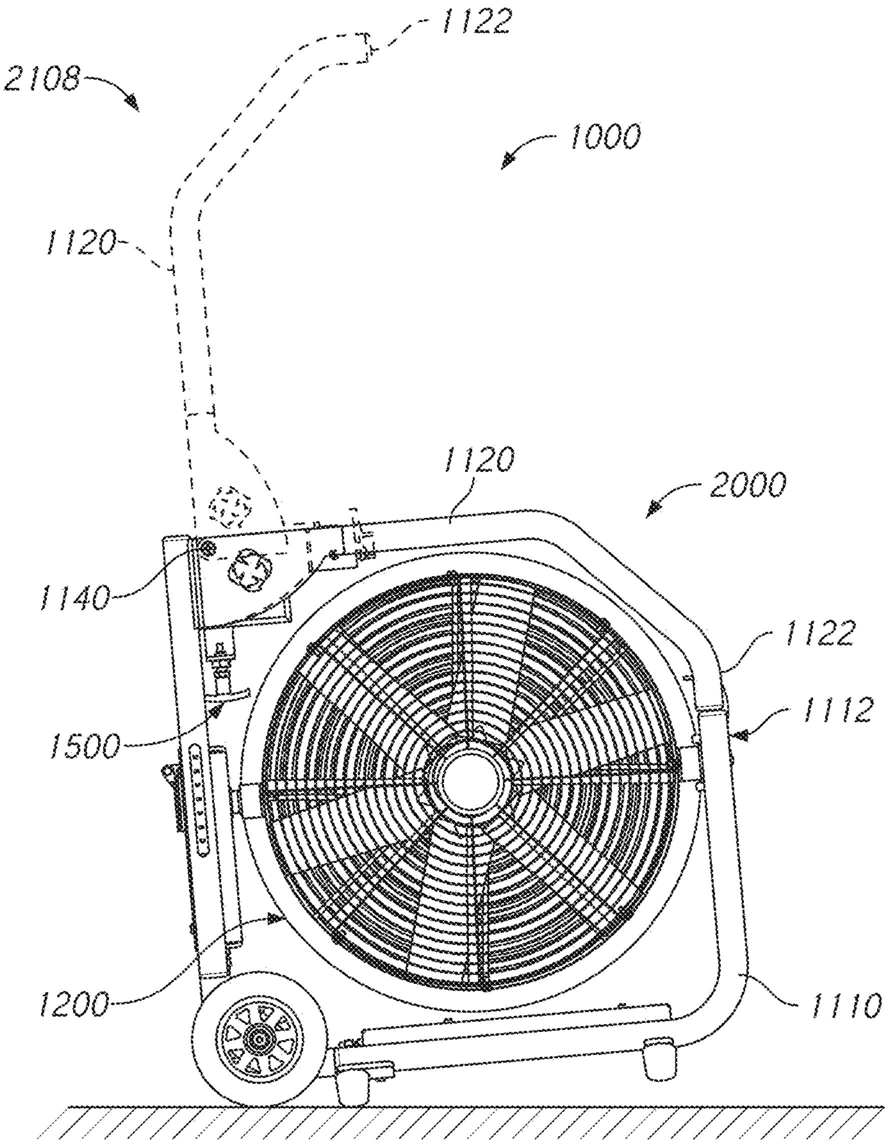

In certain embodiments, shown in FIG. 4A-FIG. 4B, the first configuration 2000 comprises the second frame portion 1120 and the first frame portion 1110 in a substantially contiguous border around the fan assembly 1200. Alternatively, in a second configuration 2100, the second frame portion 1120 of the frame is rotated upward and away from the fan assembly 1200 about the first axis of rotation 1140, thereby configuring the second frame portion 1120 to be used for transporting the portable fan 1000, similarly to a hand truck. In the second configuration 2100 a user is able to use a distal end 1122 of the second frame portion to rotate the portable fan 1000 to engage a roller assembly 1400, thereby permitting the user to pull or push the portable fan 1000 to a desired location without the need to lift the portable fan 1000 from the ground.

In certain embodiments, referencing FIG. 4A, to allow the rotation of the second frame portion 1120 in relation to the first frame portion 1110, a user must actuate a hinge lock 1500. The hinge lock 1500 maintains the position of the second frame portion 1120 in relation to the first frame portion 1110 when not actuated. It will be appreciated that a hinge lock 1500 is not limited to locking the frame 1100 in a first configuration 2000 and second configuration 2100 as shown. In certain embodiments, a frame release 1550 (shown in FIG. 1A) located between the distal end 1112 of the first frame portion and a distal end 1122 of the second frame portion must be actuated to allow the rotation of the second frame portion 1120 from the first frame portion 1110 in transitioning from a first configuration 2000 to a second configuration 2100. In certain embodiments, frame release 1550 maintains the position of the second frame portion 1120 in relation to the first frame portion 1110 when not actuated.

Figure 5A:
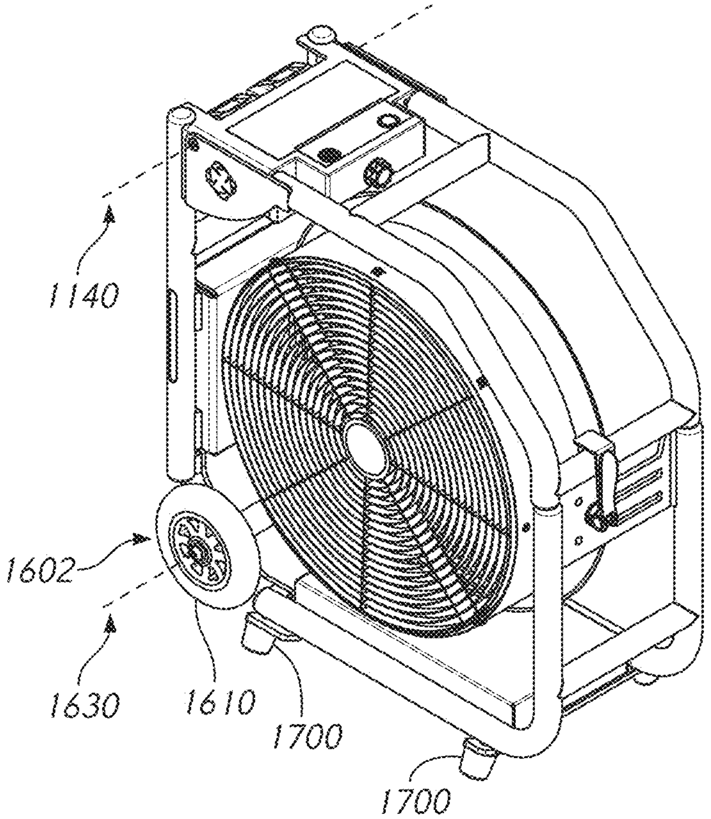
Figure 5B:
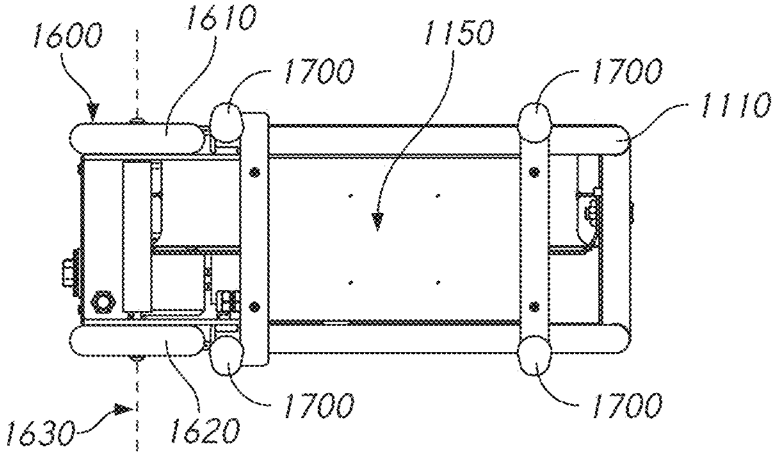

In certain embodiments of a portable fan 1000, shown in FIG. 5A-FIG. 5B, a wheel assembly 1600 comprises a first wheel 1610 and a second wheel 1620 rotatably interconnected to the first frame portion 1110 wherein the first wheel 1610 and the second wheel 1620 rotate about a second axis of rotation 1630. In certain embodiments the second axis 1630 of rotation is parallel with the first axis of rotation 1140.

In certain embodiments, shown in FIG. 5B, a portable fan 1000 further comprises feet interconnected to a bottom aspect 1150 of the first frame portion 1110 configured to engage with the ground. The feet 1700 contact the ground, prior to a user engaging a wheel assembly 1600 with the ground, such that the feet 1700 provide a static base for the portable fan 1000 when not in transport by a user. Although embodiments are shown disclosing four feet 1700, it will be appreciated that embodiments having a singular foot, less than four feet, or more than four feet are within the spirit and scope of the present invention. Furthermore, it will be appreciated that embodiments having feet 1700 configured to engage with the ground connected to a bottom aspect 1150 of the first frame portion fan while the wheel assembly 1600 is engaged with the ground is within the spirit and scope of the present invention.

Figure 6A:
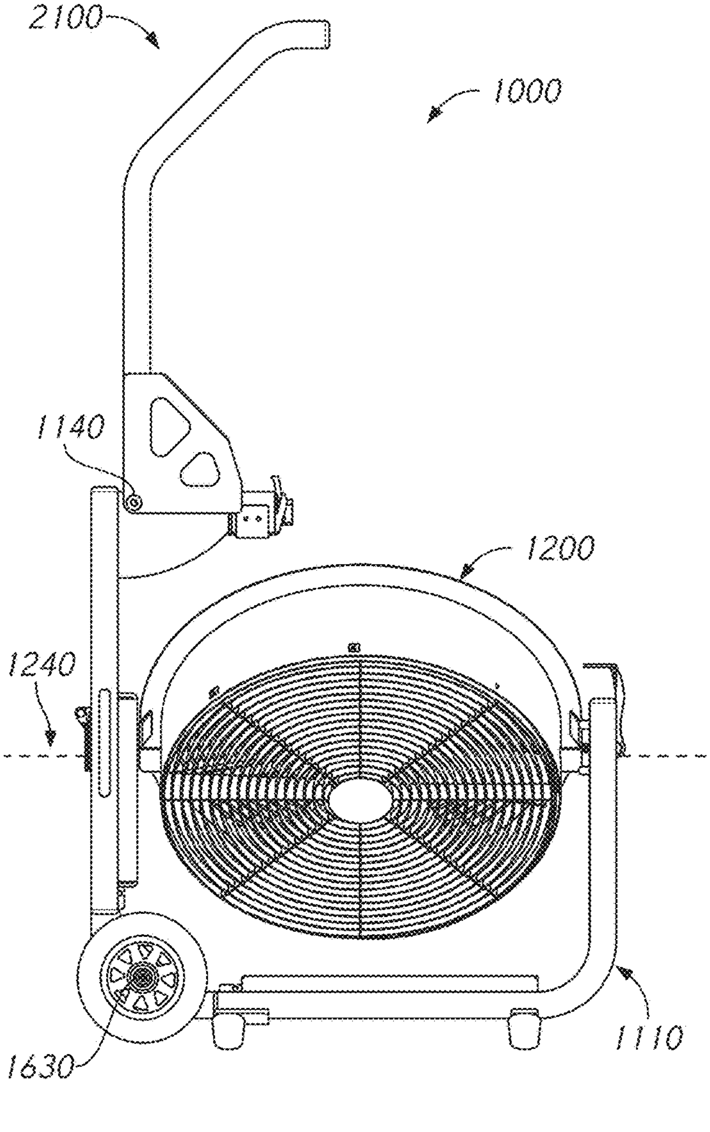
Figure 6B:
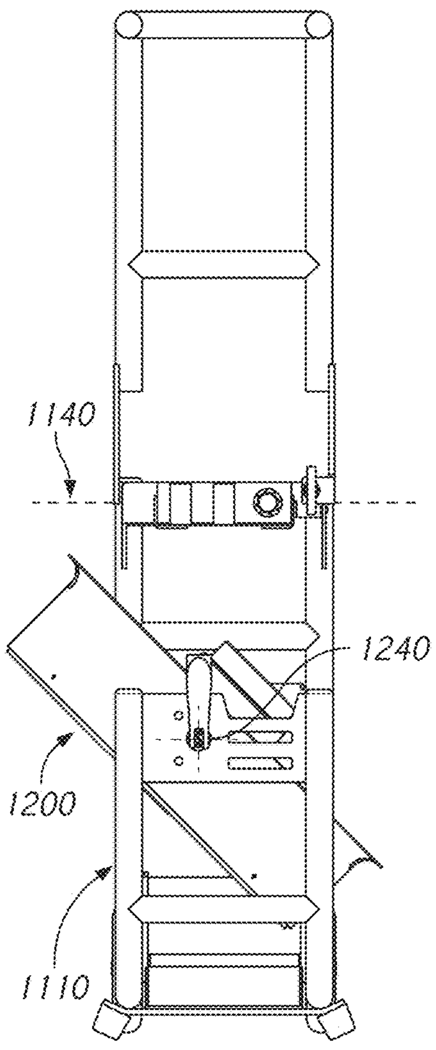
Figure 6C:
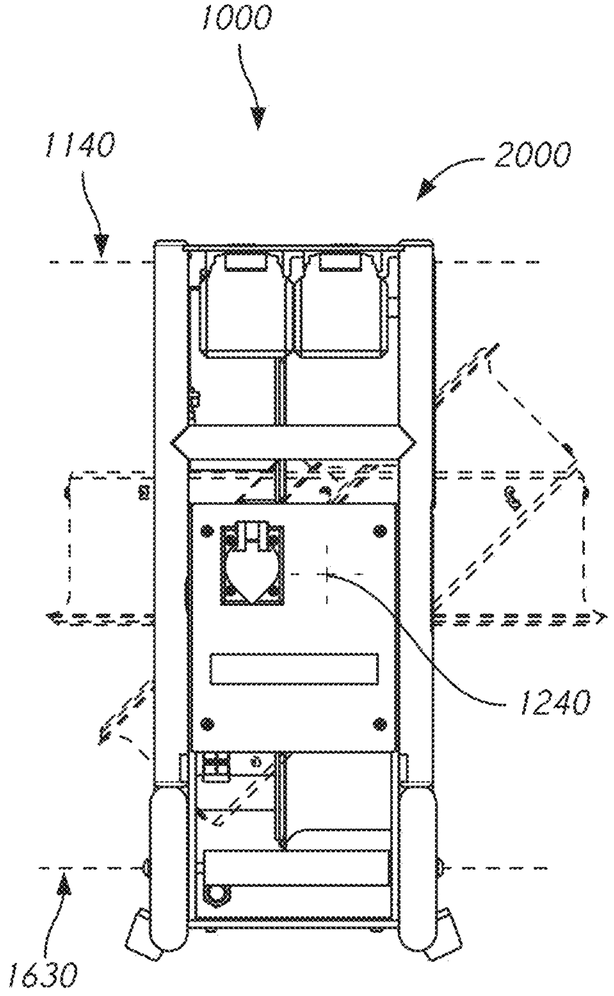

In certain embodiments, shown in FIG. 6A-FIG. 6C, the fan assembly 1200 is rotatably interconnected to the first frame portion 1110, wherein the fan assembly 1200 is rotatable about a third axis 1240. In certain embodiments, the third axis 1240 is substantially orthogonal to the first axis 1140 and the second axis 1630. The fan assembly 1200 is rotatably adjustable while the portable fan 1000 is in a first configuration 2000 or a second configuration 2100. Thus, the fan assembly 1200 is rotatably adjustable to allow configuration wherein the fan can be configured to provide positive pressure ventilation in a forward attack, a positive tilt attack (upward angle), negative tilt attack (downward angle), vertically upwards such as necessary for an attic attack or vertically downward such as necessary for a manhole attack. Certain embodiments allow rotatable adjustability within the frame 1100 without restriction regardless of if the portable fan 1000 is in a first configuration 2000 or second configuration 2100. Thus, a fan assembly 1200 has an equal range of rotatable adjustability in a first configuration 2000 as in a second configuration 2100. Certain embodiments comprise a range of rotatable adjustability of 90 degrees upward, and 90 degrees downward for a total of 180 degrees range of rotatable adjustability. It will be appreciated that certain embodiments may have up to 360 degrees of rotatable adjustability, or continuous adjustability while keeping within the spirit and scope of the present invention.

Figure 7A:
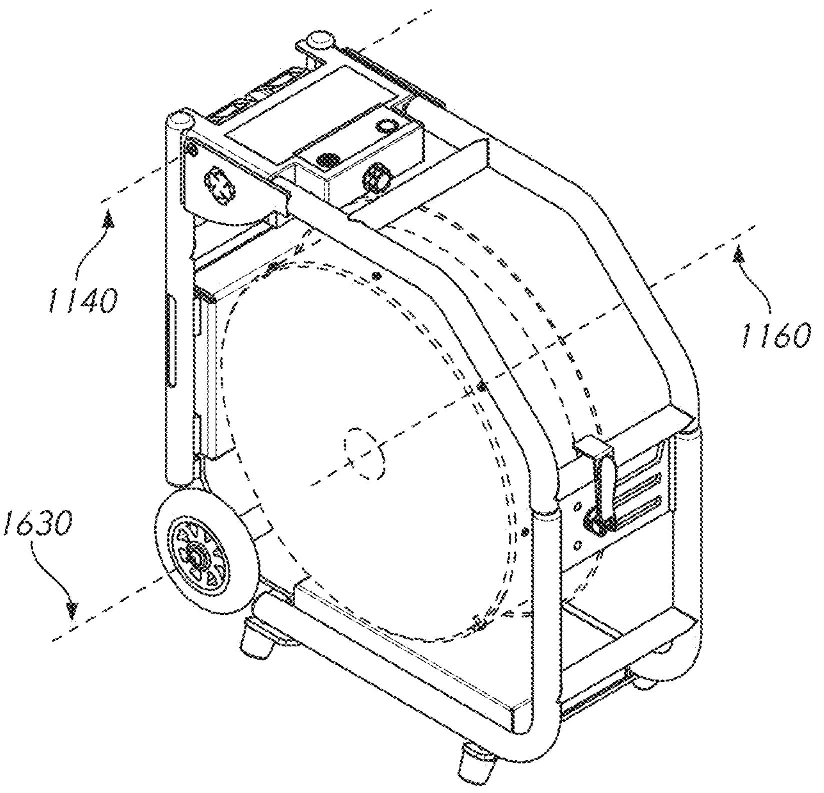
Figure 7B:
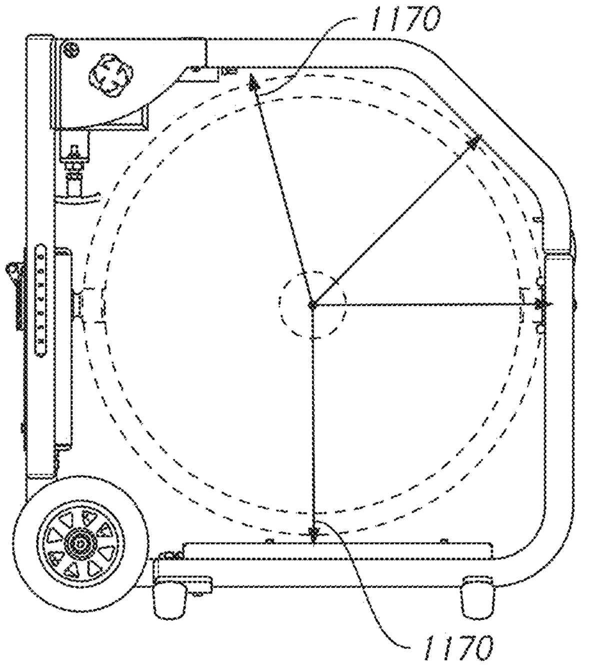

In certain embodiments, the frame 1100 surrounds the fan assembly 1200. The frame 1100 comprises radial offsets 1170 from a fourth axis 1160 which is parallel to the first axis 1140 and the second axis 1630 as shown in FIG. 7A-FIG. 7B. It may be desired, but is not required that the fourth axis 1160 is coincident with a central aspect of the fan assembly 1200. Furthermore, the radial offsets 1170 need not be equivalent in each radial direction from the fourth axis 1160 in order to be in keeping with the spirit and scope of the present invention. It will be appreciated that although a generally rectangular frame 1100 is shown, a frame 1100 having alternative shapes such as round or oblong are in keeping with the spirit and scope of the present invention. It will be further appreciated that a frame can have a shape configured to surround a single fan assembly or multiple fan assemblies as desired while in keeping with the spirit and scope of the present invention.

Figure 8A:
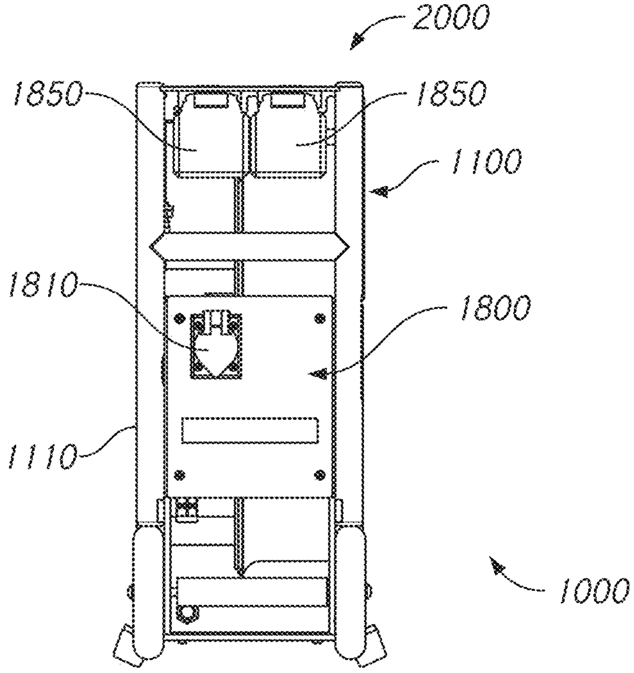
Figure 8B:
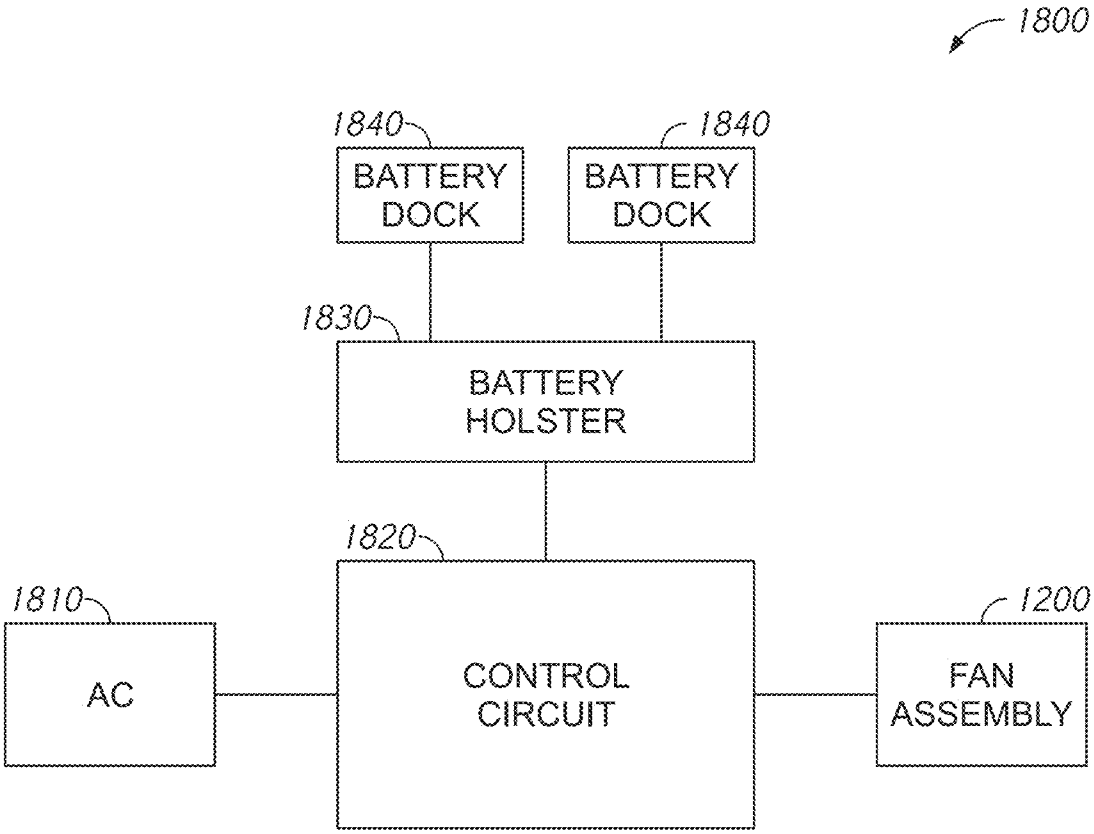
Figure 8C:
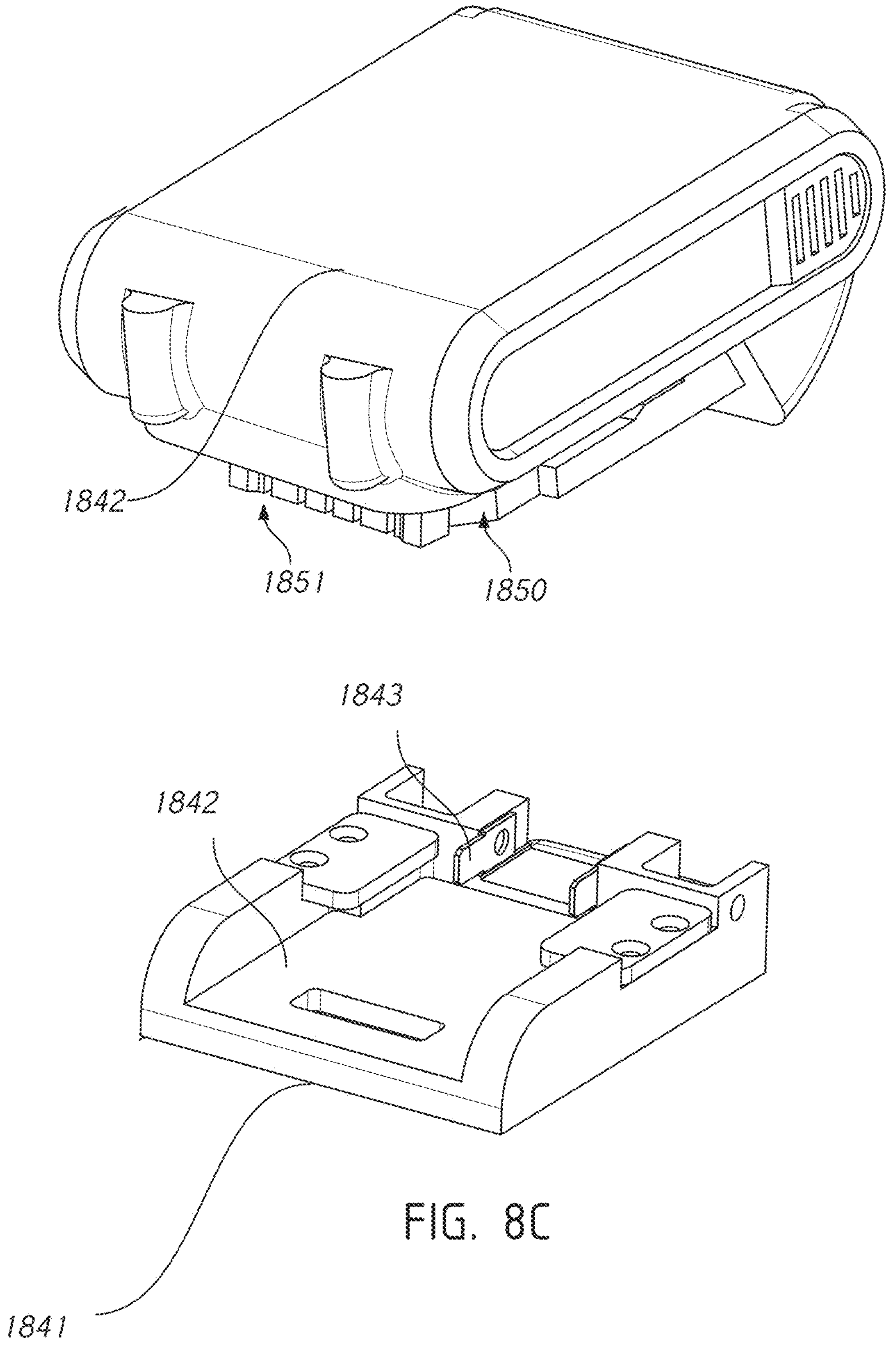

Certain embodiments, shown in FIG. 8A-FIG. 8C, comprise a power assembly 1800 connected to the first fame portion 1110 wherein the power assembly 1800 comprises an AC interface 1810, a control circuit 1820 for controlling the power provided to the motor of the fan assembly 1200. In certain embodiments a power assembly 1800 further comprises a battery holster 1830 electrically connected to the power assembly 1800. The battery holster 1830 is configured to slidably receive a battery dock 1840 wherein a first side 1841 of the battery dock is configured to interconnect with the battery holster 1830 and the second side 1842 of the battery dock is configured to interconnect with a rechargeable battery 1850. The battery holster 1830 of certain embodiments is configured to be within the envelope of the frame 1100 particularly when the frame 1100 is in a first configuration 2000.

Certain embodiments comprise a battery holster 1830 configured to slidably receive a first battery dock 1840 and a second battery dock 1840, thus enabling the electrical connection of a first battery 1850 and a second battery 1850 to the power assembly 1800. In certain embodiments a control circuit 1820 is configured to receive power from the first battery 1850 and the second battery 1850 simultaneously. In certain embodiments, a first battery 1850 and a second battery 1850 have differing power capacities, and the control circuit 1820 is configured to selectively draw power from the first battery 1850 or the second battery 1850 individually, equally simultaneously, or draw differing electrical loads from the first battery 1850 and second battery 1850 simultaneously. Furthermore, the control circuit 1820 of certain embodiments is configured to receive AC power from the AC interface 1810 to alternatively power the portable fan 1000, recharge the batteries 1850, or simultaneously recharge the batteries 1850 and power the portable fan 1000.

While various embodiments of the present invention have been described in detail, it is apparent that modifications and alterations of those embodiments will occur to those skilled in the art. However, it is to be expressly understood that such modifications and alterations are within the scope and spirit of the present invention. Further, the inventions described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A portable fan comprising:

a frame comprising a first frame portion and a second frame portion;

a hinge interconnecting the first frame portion and the second frame portion, the hinge having a first axis of rotation;

a wheel assembly rotatably interconnected to the first frame portion about a second axis of rotation, the wheel assembly configured to engage the ground, and the second axis of rotation substantially parallel to the first axis of rotation;

a fan assembly comprising a motor, the fan assembly rotatably interconnected to the first frame portion about a third axis of rotation, the third axis of rotation substantially orthogonal to the first axis and second axis of rotation;

the fan assembly having a range of adjustability about the third axis of rotation; and a fourth axis parallel to the first axis;

wherein in a first configuration, the first frame portion and the second frame portion are configured to form a substantially contiguous border around the fan assembly that is radially offset from the fourth axis and the wheel assembly is configured to be elevated from the ground, wherein in a second configuration, the second frame portion is configured to extend away from the hinge in an upward direction, and wherein the range of adjustability of the fan in the first configuration is equal to the range of adjustability of the fan in the second configuration.

2. The portable fan of claim 1 further comprising:

a power assembly connected to the first frame portion, the power assembly comprising a rechargeable battery holster, an AC power interface, and a control circuit for controlling the supply of electricity to the motor.

3. The portable fan of claim 2 further comprising:

a first battery dock having a first side and a second side, the first side configured to matably engage a first battery, and the second side configured to matably engage the battery holster, wherein mating the first battery with the first side of the first battery dock, and mating the second side of the first battery dock with the battery holster, results in the first battery and the control circuit being electrically connected.

4. The portable fan of claim 3 further comprising:

a second battery dock having a first side and a second side, the first side configured to matably engage a second battery, and the second side configured to matably engage the battery holster, wherein mating the second battery with the first side of the second battery dock, and mating the second side of the second battery dock with the battery holster, results in the second battery and the control circuit being electrically connected.

5. The portable fan of claim 4, wherein the control circuit is configured to receive power from the first battery and the second battery.

6. The portable fan of claim 5, wherein the first battery and the second battery comprise differing power capacities.

7. The portable fan of claim 6, wherein the control circuit is configured to selectively draw power from the first battery and the second battery individually.

8. The portable fan of claim 7, wherein the control circuit is configured to recharge the batteries from AC power received through the AC power interface.

* * * * *